(12) United States Patent
Gandy

(10) Patent No.: US 6,880,220 B2
(45) Date of Patent: Apr. 19, 2005

(54) METHOD OF MANUFACTURING COLD WORKED, HIGH STRENGTH SEAMLESS CRA PIPE

(75) Inventor: John Gandy, Conroe, TX (US)

(73) Assignee: John Gandy Corporation, Conroe, TX (US)

(*) Notice: Subject to any disclaimer, the term of this patent is extended or adjusted under 35 U.S.C. 154(b) by 0 days.

(21) Appl. No.: 10/788,686

(22) Filed: Feb. 27, 2004

(65) Prior Publication Data

US 2004/0200881 A1 Oct. 14, 2004

Related U.S. Application Data

(60) Provisional application No. 60/470,533, filed on May 14, 2003, and provisional application No. 60/458,849, filed on Mar. 28, 2003.

(51) Int. Cl.$^7$ .............................................. B23Q 17/00
(52) U.S. Cl. ...................... 29/407.01; 72/368; 138/171; 228/173.6; 219/121.46
(58) Field of Search ........................ 29/407.01; 72/368; 138/171; 228/173.6, 158, 173.4; 219/121.46, 76.16; 73/622

(56) References Cited

U.S. PATENT DOCUMENTS

| | | | | |
|---|---|---|---|---|
| 4,885,215 A | * | 12/1989 | Yoshioka et al. | ............ 428/632 |
| 5,600,069 A | * | 2/1997 | Girndt et al. | ................. 73/622 |
| 5,677,490 A | * | 10/1997 | Gunther et al. | ............... 73/622 |
| 5,867,275 A | * | 2/1999 | Curtis et al. | ................. 356/635 |
| 6,375,059 B1 | * | 4/2002 | Ohnishi et al. | ............. 228/117 |
| 6,532,995 B1 | * | 3/2003 | Asahi et al. | ................ 138/171 |

* cited by examiner

Primary Examiner—David P. Bryant
(74) Attorney, Agent, or Firm—Charles D. Gunter, Jr.

(57) ABSTRACT

A process produces a welded seamless PIPE having good yield strength and excellent corrosion and/or erosion resistance. Up to a maximum outside diameter corrosion and/or erosion resistant CRA PIPE is cold worked from a welded hollow, rather than using the traditional seamless pierced hollow method. A high-speed roll-forming mill is also utilized, rather than using the slow traditional break press to form the welded hollow. Welded hollow dimensions can be achieved which comply with the method of cold working's capability to produce the yield strengths and dimensional tolerances required to meet the service criteria of the PIPE's intended application.

8 Claims, 2 Drawing Sheets

METHOD OF MANUFACTURING COLD WORKED, HIGH STRENGTH SEAMLESS CRA PIPE

CROSS REFERENCE TO RELATED APPLICATION

This application claims priority from earlier filed provisional application Ser. No. 60/470,533, filed May 14, 2003, entitled "Method of Manufacturing Cold Worked, High Strength Seamless CRA Pipe," and from provisional application Ser. No. 60/458,849, filed Mar. 28, 2003, entitled "Method of Manufacturing Welded Seamless, Up to the Maximum Diameter CRA and/or Erosion Resistant CRA Pipe."

BACKGROUND OF THE INVENTION

1. Field of the Invention

The present invention relates to a method for manufacturing corrosion or erosion resistant alloy (CRA) down-hole tubulars and line pipe, both hereafter called (PIPE), and more particularly, to a method for manufacturing cold worked, high strength welded seamless CRA PIPE.

2. Description of the Prior Art

PIPE includes drill pipe, tubing and casing, line pipe, and mechanical pipe used in drilling, completion, production, waste disposal and transportation of liquids, gas and slurries in the oil and gas, petro-chemical, mining, and power-generating industries. In some corrosive and erosive applications increased volume of product flow is desirable. To increase flow requires an increase in the inside diameter (ID) size of the PIPE. Increase of corrosion and/or erosion resistant CRA PIPE size is restrained by the world's capability to manufacture such PIPE with current seamless technology. In recent years, work has been done to develop PIPE having higher strength and better resistance to failure under severe stress, corrosive and erosive applications, however work has not been done to increase the PIPE size or develop the ability to manufacture larger sizes. Corrosion and/or erosion resistant CRA work was necessitated by the demand for tubulars suitable for use in erosive atmospheres where the product being transported contains abrasive material capable of eroding the inside diameter (ID) surface of the PIPE and/or corrosive atmospheres containing hydrogen sulfide, carbon dioxide, chlorides associated hydrocarbons, and/or acid with low pH factors. PIPE subjected to these conditions may fail in a relatively short time due to such factors as sulfide and chloride stress cracking, corrosive pitting, erosive wear and general wall loss. Resistance to failure may be influenced by many factors, including the steel chemistry, the nature and amounts of alloying elements, the steel microstructure, the steel mechanical processing, and the nature of the heat treatment.

In regard to corrosion, commonly used methods of preventing corrosion in PIPE include coating ID surface with a thin layer of an anti-corrosive material, increasing wall thickness of PIPE, cladding the ID of carbon pipe with a corrosion and/or erosion resistant CRA, or utilizing a solid corrosion or erosion resistant CRA PIPE. The primary purpose of coating is to extend the operational life of the PIPE by providing a physical barrier between the corrosive agent and the base metal. Typical coating materials include paint, phenolic, epoxy, urethane, and nylon.

In regard to erosion, commonly used methods of handling erosion in PIPE include heat hardening the ID surface of the PIPE, increasing wall thickness of PIPE, cladding the ID of carbon PIPE with corrosion and/or erosion resistant CRA, or utilizing a solid corrosion and/or erosion resistant CRA PIPE.

Another way to slow corrosion and erosion is to increase by weight the corrosion and/or erosion resistant CRA alloy elements of the PIPE. An example is a chromium alloy combined with a nickel alloy. In such alloys, chromium and nickel are the main alloying elements, although chromium and nickel are reactive elements, the alloys passivate and exhibit excellent resistance to various types of corrosion and erosion in many different environments.

Preferably an alloy for corrosion has at least 22% chromium by weight and nickel content having at least 5% by weight and for erosion at least 20% chromium by weight and nickel content having at least 58% by weight, and at least 8% molybdenum by weight. A good example of CRA PIPE is one having a 22% chromium and 5% nickel alloy content by weight defined under the name 2205 and a good example of corrosion and/or erosive resistant CRA PIPE is one having a 20% chromium, 58% nickel and at least 8% molybdenum by weight defined under the name Alloy 625. John Gandy Corporation of Conroe, Tex. sells both.

The above noted problems and other similar corrosion and erosion problems make it desirable to provide a PIPE formed, at least in part, of a CRA. However, the introduction of such CRA poses additional manufacturing challenges for the production of larger size PIPE of the type under consideration. There are two well-known commercial processes in use for manufacturing prior art PIPE such as those used in the industries that utilize PIPE. These processes produce either "seamless" PIPE or they produce "welded" PIPE.

In a typical seamless prior art process, a seamless PIPE is manufactured, for example, from a solid billet of steel with a limited mass of about 10 inches in diameter and 6 to 8 feet long. The combination of the OD, ID and length of the finished PIPE is totally dependent upon the mass of the billet. After heating the solid billet to over 1000 degrees C., a hole is pierced by a method such as Mannesmann piercing, press piercing to create a longitudinal hole through the center of the solid billet to form a very thick-walled seamless hollow. The wall thickness and diameter of this seamless hollow are then progressively reduced by extrusion or by another hot or cold sizing method until a seamless PIPE of a predetermined size is obtained. Few mills are capable of producing a CRA billet with sufficient mass to manufacture a finished CRA PIPE in the desired longer length and heavier wall in conjunction with a large OD.

Welded PIPE, on the other hand, is made from a flat strip, which is formed into a PIPE and welded along its length. This is a straightforward way of making a welded PIPE. However, additional care is necessary to avoid structural and cosmetic defects at the weld. Since such problems cannot arise from a seamless PIPE, the seamless manufacturing process offers advantages in many situations. However, the costs incident to the manufacture of seamless PIPE, and particularly of certain sizes, together with the difficulties attendant upon the known processes of producing such seamless PIPE, and the lack of uniformity with respect to successive seamless PIPES has, to a large extent, driven the industry to the use of welded carbon alloy PIPE. However, corrosion and/or erosion resistant welded CRA PIPE has not been qualified, accepted or used in down-hole harsh corrosion and or erosion applications.

Prior art for welded CRA PIPE used in the as-welded condition, without cold work or forging of the weld, required the weld's yield and tensile strengths and corrosion and/or erosion resistances to be equal or exceed that of the parent material. Traditionally the welding of CRA PIPE for use in the as-welded condition utilizes a dissimilar high alloy CRA filler material of higher yield and tensile strengths and more corrosion and/or erosion resistance than the parent metal. CRA PIPE welded by this method is traditionally joined together by welding the circumference of one end of a PIPE to the end of another PIPE; this method is referred to as a girth weld. The girth weld of PIPE will remain in the as-welded condition for applications that allow welding prior to the time of installation. As-welded CRA PIPE is not applicable for down-hole applications because of its lower strengths of both the parent and weld materials in addition to dissimilar strengths, non-uniform corrosion and/or erosion resistance and potential galvanic corrosion between the dissimilar alloys of the weld and parent material. Also, down-hole installations traditionally utilized seamless CRA PIPE manufactured by the seamless billet method with fast joining threaded specialty connections to save time and reduce cost of the expensive drilling rig. Girth welding and temper of the as-welded CRA PIPE requires substantial time and is not economically feasible to perform at the time of installation at the drilling rig.

Traditionally down-hole applications for CRA PIPE have been restricted to cold work CRA PIPE manufactured by the seamless pierced billet method. To the applicants knowledge cold worked welded CRA PIPE has not been used in a down-hole application.

Prior Art for traditional seamless CRA PIPE is manufactured by the pierced seamless billet method and cold worked by pilger or drawn over mandrel methods. Cold work of low yield and tensile strengths of high alloy CRA pierced seamless billets elongates the pierced billet and increases the yield and tensile strengths necessary for down-hole high alloy CRA PIPE applications. After cold work, the PIPE cannot be subjected to elevated critical temperatures without lowering the strengths built in by the cold work process.

Traditionally, the use of similar filler material to that of the parent material when welding CRA PIPE has not been acceptable for use in the as-welded condition for applications with high internal pressure or where corrosive and/or erosive products are present. CRA PIPE with a weld with similar filler material to that of the parent material results in a PIPE with the weld with lower yield and tensile strengths than that of the parent material and is unacceptable for use in above ground applications. However, cold work of such a weld and parent material produces higher yield and tensile strengths that are alike or similar, for both the weld and the parent metal, that is acceptable for down-hole applications. This phenomena is the result of annealing the full body to make the weld and the parent materials granular structure homogenous and the cold work compresses the granular structure to similar size with similar higher yield and tensile strengths.

Traditionally cold working or forging of the weld has not been necessary for as-welded high alloy PIPE for use in-ground surface applications. However, high alloy CRA PIPE for down-hole application is traditionally cold worked or forged to obtain higher yield and tensile strengths required to contain high pressure and support high tension loads from the weight of the PIPE. To compensate for the absence of cold work or forging of the weld a dissimilar and more noble filler material with higher yield and tensile strengths with enhanced corrosion and/or erosion resistance than that of the parent metal is utilized in the welding process to add strengths and corrosion and/or resistance to the weld that equals or exceeds that of the parent metal. This compensation does not lend itself to uses for PIPE in down-hole applications because without cold work, the yield strengths of both the weld and PIPE body are inadequate for down-hole specifications and the dissimilar more noble alloy of the weld to parent alloy lends itself to a galvanic corrosion situation when submerged in down-hole liquids. Additionally, after cold working the more noble alloy in the weld is unacceptable due to being substantially higher in yield and tensile strengths and harder and more brittle than the parent metal.

There are presently two methods of cold working a hollow to obtain sufficient high strength to meet the required mechanical strengths for tensile, yield, burst and collapse for the finished PIPE. The first method is by cold draw where a larger hollow is pulled or drawn through a smaller die, reducing the OD and simultaneously reducing the ID over a retained mandrel and then repeat the same process to obtain the required mechanical strengths. The second method is by pilger where a hollow is mechanically forged under high pressure through a set of dies substantially reducing the OD and simultaneously reducing the ID over a mandrel to obtain the required mechanical strengths.

The invention is a method that combines the economics of welding with the advantages of seamless as a means to manufacture a hollow that offers quality, flexibility and economics that are equal or superior to traditional seamless methods. The hollow would then be cold worked into a finished welded seamless PIPE with required mechanical strengths. Cold Working is a method to cold forge the complete through wall circumference of the OD of the hollow down to a smaller OD while escalating the yield and tensile strengths to substantially elevated levels above those of the hollow. To obtain uniform strengths for the PIPE the hollow is restricted to a chemistry of alloying elements through wall around the complete circumference of the welded hollow. The hollow must be welded without filler metal or with similar filler metal of like chemistry to that of the parent metal. If filler metal with a more noble chemistry than that of the parent metal is used it will produce a metal that is unacceptably harder and more brittle that is higher in yield and tensile strengths in the weld area than in the parent material.

The welded hollow is made from a thick corrosion or erosion resistant CRA plate, which is formed into a hollow that is welded along its length. This is a straightforward way of making a hollow. However, substantial steps must be taken to insure that the weld and the adjacent heat affected zone are structurally sound, cosmetically formed to the body surface and homogenous to the un-welded portion of the hollow.

The present invention has as one object to develop welded seamless high strength corrosion or erosion resistant CRA PIPE up to the maximum OD as an alternative to a seamless, high strength corrosion and/or erosion resistant CRA PIPE up to a maximum OD.

Another object of the present invention is to develop a method to manufacture welded corrosion and/or erosion resistant CRA hollows that equal or exceed the quality and performance of seamless corrosion and/or erosion resistant CRA hollows produced by the present pierced billet methods.

Another object of the invention is to develop a method to manufacture welded corrosion and/or erosion resistant CRA hollows that is commercially economical with seamless corrosion and/or erosion resistant CRA hollows produced by the pierced billet method.

SUMMARY OF THE INVENTION

The present invention relates to a process for producing a welded corrosion and/or erosion resistant CRA hollow to be utilized in the process of manufacturing a welded seamless corrosion and/or erosion resistant CRA PIPE having high yield and tensile strengths with excellent corrosion and/or erosion resistance. More particularly, the invention relates to a process for producing a welded seamless corrosion and/or erosion resistant CRA PIPE having high strength, toughness and excellent corrosion and/or erosion resistance, especially sulfide stress cracking resistance, which is characterized by a combination of specified chemical composition of raw materials (CRA plate) and specified thermal and mechanical treatment of the PIPE.

The present welded seamless process includes cold work of a welded corrosion and/or erosion resistant CRA hollow into a welded seamless corrosion and/or erosion resistant CRA PIPE up to a maximum OD, rather than using the traditional seamless pierced CRA hollow method. The process of the invention also utilizes commercially economical high-speed roll-forming mill to form the corrosion and/or erosion resistant CRA plate into a welded hollow, rather than using the not commercially economical slow traditional break press. The process involves, in part, developing dimensions for the welded hollow to comply with a cold work method to produce the required tensile, yield strengths and dimensional tolerances for a finished welded seamless corrosion and/or erosion resistant CRA PIPE.

In the preferred method of the invention, a corrosion and/or erosion resistant CRA plate is manufactured to specifications dependent upon the characteristics of the intended use. A hollow is then formed having a wall thickness, a length, and a longitudinal seam region by feeding the plate through a high-speed roll forming mill, rather than using a traditional break press. The longitudinal seam region of the hollow is then welded using gas tungsten arc welding often referred to as TIG using inert gas or plasma welding process either of which achieves a complete weld penetration through the wall thickness with similar filler metal to that of the parent metal or without the use of a filler material. The weld seam is then ultrasonically inspected (UT) with multiple probes to determine if any defects in the weld are present. In the event a defect or defects are discovered, the defect is repaired or is removed. The inspected weld is platened or forged and then the full body of the welded hollow is subjected to heat treatment to homogenous the weld zone with the mother plate. Next, the hollow is blasted or chemically pickled to remove all oxide deposits from the OD and ID. The welded hollow is now ready to be reduced in size and wall thickness by cold working into a finished high strength welded seamless corrosion and/or erosion resistant CRA PIPE.

The method of the invention results in several distinct advantages as follows:

1) The uniform thickness of the plate results in a more consistent wall thickness of the welded hollow, therefore the finished welded seamless corrosion and/or erosion resistant CRA PIPE has an extremely uniform wall thickness in comparison to traditional seamless CRA PIPE.

2) The uniform ovality of the welded hollow is formed by the roll forming mill, resulting in a finished welded seamless corrosion and/or erosion resistant CRA PIPE that has an extremely uniform ovality in comparison to traditional seamless CRA PIPE.

3) Hollow lengths on a break press are restricted to the length of the break press. Unlike on a break press, welded hollow lengths formed on a roll forming mill, are not restricted. The results are increased mass providing larger OD and longer lengths of finished welded seamless.

4) Provides an economical method to produce quality hollows necessary for the manufacture of high strength corrosion and/or erosion resistant CRA PIPE that is needed to fill requirements for corrosion and/or erosion resistant CRA PIPE to produce highly corrosive oil and gas reserves.

5) Provides the opportunity for additional existing PIPE mills to manufacture high strength corrosion and/or erosion resistant CRA PIPE with minimal equipment expenditures.

Additional objects, features and advantages will be apparent in the written description, which follows.

DETAILED DESCRIPTION OF THE INVENTION

Figure 1:
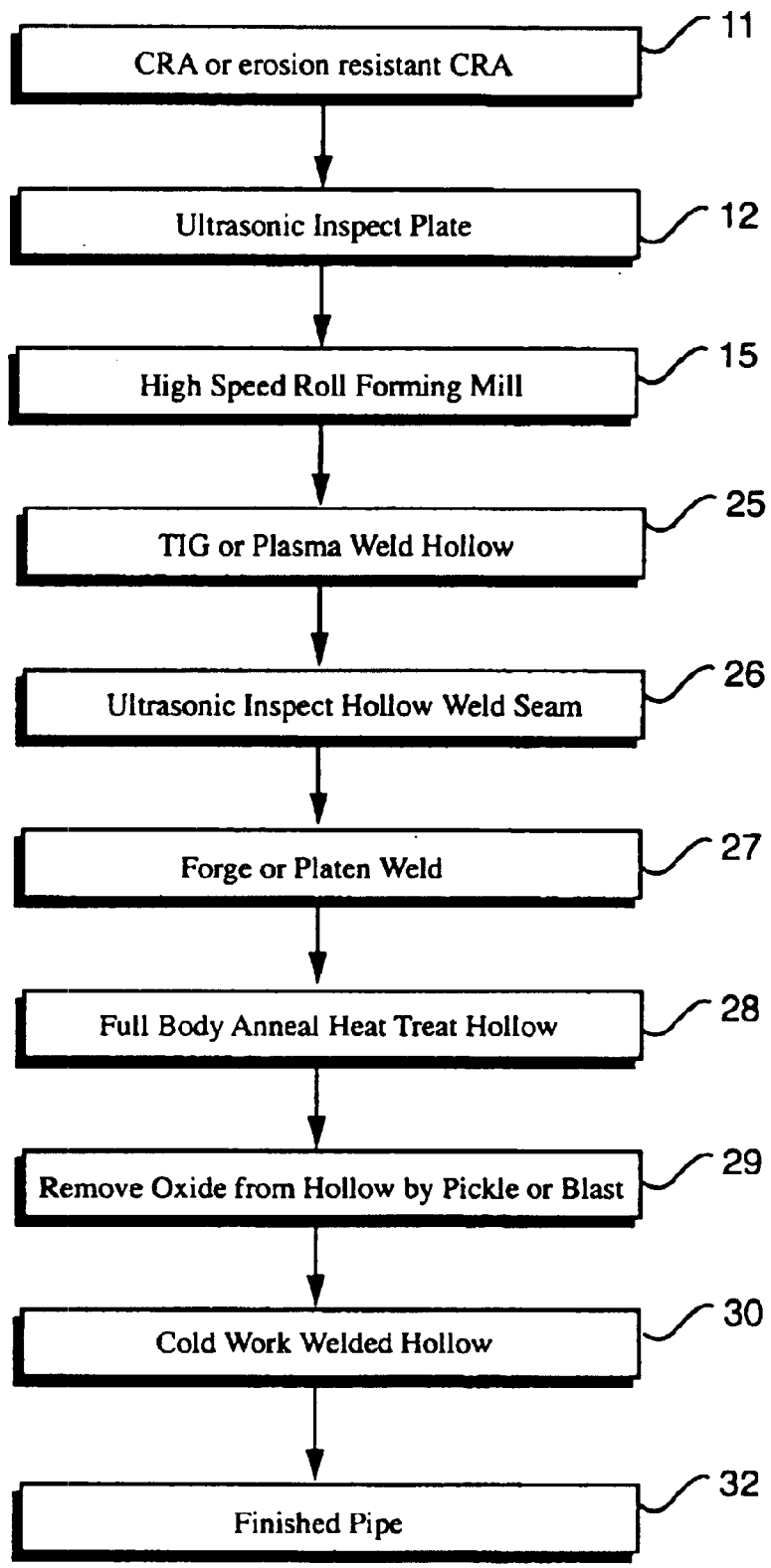
FIG. 1 is a simplified flow diagram illustrating the steps in the method of the invention.

Referring now to FIG. 1 of the drawings, there is shown in schematic fashion, a particularly preferred method of practicing the present invention. In the first step of the method, illustrated as 11, a finished plate of corrosion or erosion resistant alloy (CRA) is provided as the starting material to be formed into the PIPE of the invention. The nature of the corrosion and/or erosion resistant CRA material selected will depend upon the particular environment encountered including corrosive and/or erosive elements present, temperature and pressure, etc. A PIPE design computer program is available from John Gandy Corporation of Conroe, Tex., to enable the operator to design the optimum PIPE string taking into account the anticipated environment. Such a PIPE string will include lengths of corrosion and/or erosion resistant CRA material. Typical examples of corrosion and/or erosion resistant CRA type materials include: (1) stainless steel; conventional austenitic, high alloy austenitic, martensitic, precipitation hardened, duplex and ferritic; (2) precipitation hardened and solid solution nickel-base alloys; nickel copper alloys; and (3) cobalt-base, titanium and zirconium alloys. This description of the general classification of corrosion and/or erosion resistant CRA materials actually includes a myriad of material options, depending upon the application under consideration, and is merely intended to be illustrative of suitable materials for use in practicing the invention.

In the preferred embodiment of the invention to be described, the finished plate was a high nickel alloy starting material commercially available from Special Metals Corporation of Huntington, W.Va. The finished plate was 22% chromium with a high nickel alloy having a minimum nickel content of 42% by weight and was manufactured by forming a continuous casting in a melt furnace and passing the casting through a primary mill to form a slab. The slab was fed to a Salem or Car Bottom Furnace and then to a flattening mill. The flattening mill produces a flat plate that is ground to specified smoothness, followed by either a pickling process or shot blasting as a final finishing step. The finished plate is cut to length, ultrasonically inspected as in step 12 for minimum wall thickness before final laboratory testing.

Figure 2:
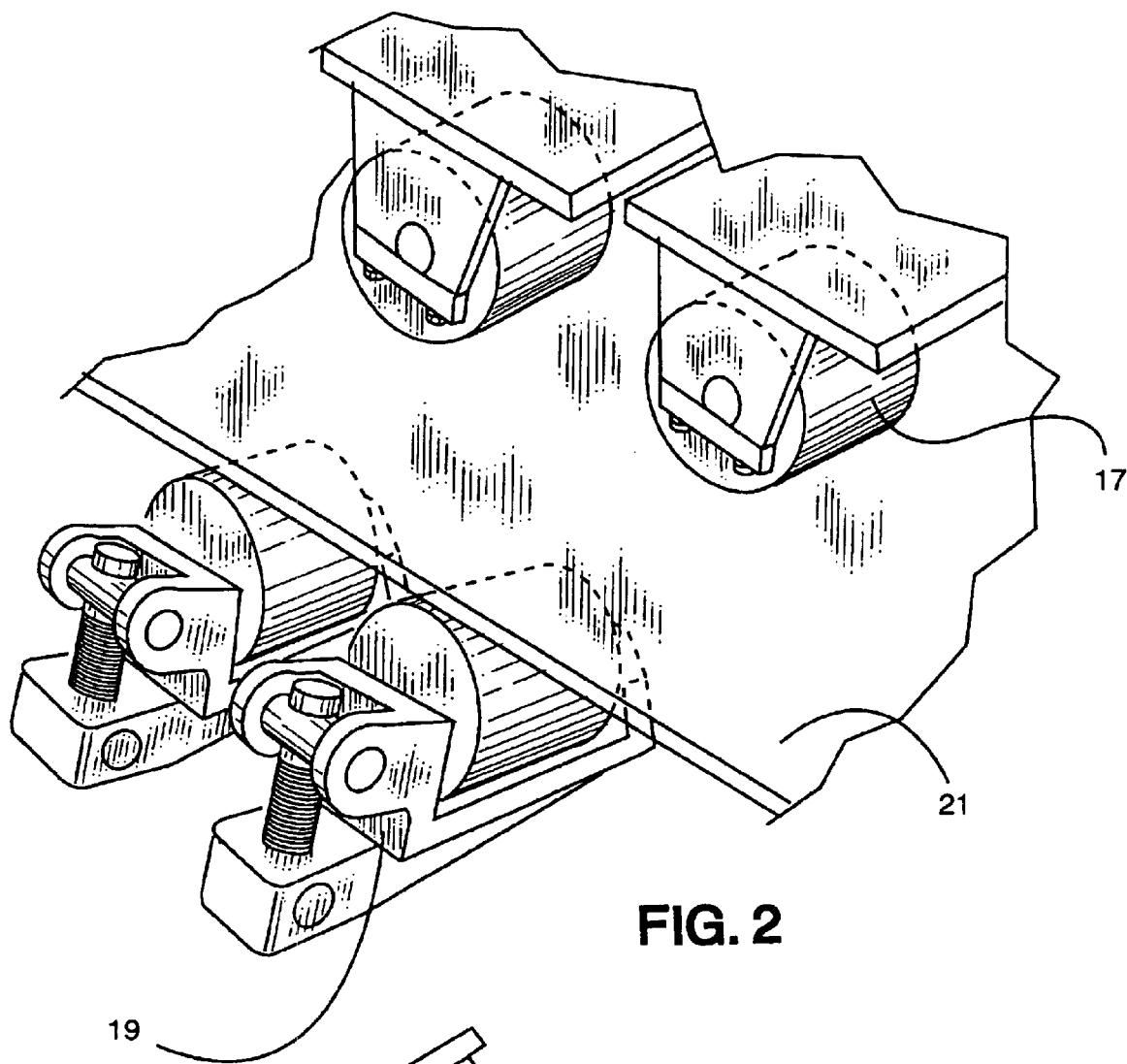
FIG. 2 is a partial, perspective view of a section finished corrosion and/or erosion resistant CRA plate being fed through the high speed roll forming mill used in one of the steps in the method of the invention.
Figure 3:
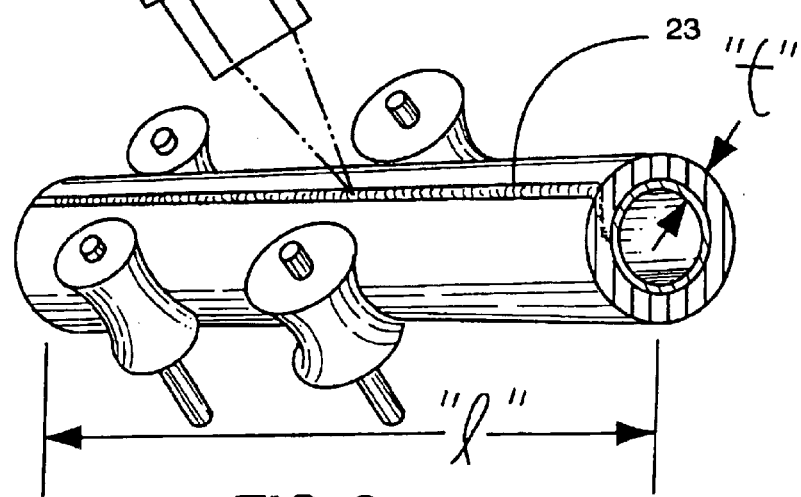
FIG. 3 is a simplified view of a corrosion and/or erosion resistant CRA hollow of the invention being welded along the longitudinal seam line using the TIG or plasma welding process in one of the steps in the method of the invention.

The finished plate from step 11 is next formed into a round hollow in a step 15 by passing the finished plate from step 11 to a high-speed roll forming step 15. A significant gain in throughput is achieved in this step by utilizing a high-speed roll-forming mill in lieu of slow traditional break presses to form the hollow. For example, typical production for a standard break press is on the order of one 20-foot joint per hour. Applicant's high-speed roll forming mill is able to achieve a production rate of up to 100 feet every 4 to 5' minutes. FIG. 2 of the drawings illustrates a typical commercial high-speed roll forming mill with longitudinal roller sets 17 and side rollers 19 acting upon the steel plate 21. As shown in simplified fashion in FIG. 3, the hollow produced in step 15 has a wall thickness "t", a length "1" and a longitudinal seam region 23 that is formed by feeding the finished plate through the high-speed roll forming mill.

In the next step of the method, the hollow produced in step 15 is welded along the seam region 23 by a special tungsten inert gas (TIG) welding process. The TIG welding process was performed by Trent Tube Corporation in the Trent Tube facility in Carrollton, Ga. Trent Tube is a leading manufacturer of welded stainless steel and high alloy PIPE products. Induction welding cannot be used to weld corrosion and/or erosion resistant CRA and is not used to join the seam region 23 of the hollow. While such techniques have been found satisfactory for carbon and low alloy steel, high chromium and nickel alloys form refractory oxides on the edges to be joined, resulting in a layer of heavy inclusions that prevent fusion or diffusion of the opposing faces. Two different welding processes have been found satisfactory for the present purposes, to achieve a 100% through-the-wall weld penetration with similar or like filler material to that of the parent metal or without the use of a filler material. The methods use gas tungsten arc welding often referred to as TIG using torch or torches, on the outside and on the inside and may be followed by cosmetic TIG pass or passes. A tungsten electrode is used to generate a high-energy arc with similar or like filler material to that of the parent metal or without the use of a filler material. The second method uses a single high energy plasma welding torch using a keyhole technique with similar or like filler material to that of the parent metal or without the use of a filler material, and may be followed by a cosmetic pass or passes with filler metal similar to that of the parent metal or without the use of a filler material.

In the particularly preferred method of the invention, the hollow is first tack welded, followed by TIG welding the longitudinal seam region along its entire length with a similar filler material of like chemistry to the chemistry of the parent metal or without the use of a filler material. The longitudinal seam is ultrasonically inspected for weld defects utilizing multiple probes as in step 26. The weld zone is then cold worked by roll forging in step 27. The welded hollow is then full body annealed in step 28 at approximately 1775 degrees F. for one hour, followed by air-cooling. Preferably, a skewed-roll continuous annealing furnace is used for the annealing step. The hollow can then be descaled in step 29 by chemical pickling, resulting in a finished hollow. The welding step 25 and heat and chemical treatment steps 28, 29 are illustrated in schematic fashion in FIG. 1.

In the next step 30 of the method of the invention, the finished hollow is subjected to cold work to produce a cold worked PIPE of the invention (32 in FIG. 1). The cold work was performed using the pilger method by The Timken Company of Canton, Ohio; a leading international manufacturer of highly engineered bearings, alloy and specialty steels and components. With one of the four largest pilger machines in the world, Timkin has become a world leader in cold-pilgered PIPE.

To briefly describe the cold pilgering process, the hollow is rotated and reduced by forging and elongating the hollow stepwise over a stationary tapered mandrel reducing the hollow. Two rolls or dies, each with a tapering semi-circular groove running along the circumference embrace the hollow from above and below and rock back and forth over the hollow (the pass length) while a stationary tapering mandrel is held in the center of the finished PIPE. At the beginning of the stroke or pass, the circular section formed between the grooves of the two opposing rolls corresponds to the diameter of the hollow and to the thickest section of the mandrel.

As the dies move forward over the hollow, the circular section reduces in area until, at the end of the pass length, the circular section corresponds to the outer diameter of the finished PIPE and the inner mandrel diameter corresponds to the inner diameter of the finished PIPE, resulting in a longer length, smaller OD and ID finished PIPE. The pilger process produces premium PIPE as in step 32, with up to 55% reduction in cross-sectional area and a superior surface finish for enhanced corrosion resistance and the ability to machine precise specialty threads on the product. Tolerances on the order of the following have been achieved to date:

Maximum OD tolerances+−0.025 inches

Maximum ID tolerances+−0.030 inches

An invention has been provided with several advantages. The process is an economical alternative to the pierced seamless billet method of manufacturing up to maximum OD chrome/nickel PIPE.

Lengths of 50 feet or more can be produced. The pilgering process in conjunction with uniform wall thickness plates offers finished PIPE with uniform wall thickness, uniform ovality, as well as uniform OD and ID. The pilger will accommodate most chrome/nickel and titanium alloys and the yield strengths and tolerances will equal or exceed like alloy industry standard yield strengths and tolerances. The welded seamless products of the invention equal or exceed the quality and performance of seamless PIPE produced by the pierced seamless billet method. The high-speed rolling mill utilized in one step in the process provides distinctive throughput advantages and economics over the slow traditional break presses used in the welded PIPE industry. The welding process achieves fusion welds with wall thicknesses up to 2.00 inch with filler metal with like chemistry of alloying elements of the parent metal or without filler metal. In order to obtain optimum mechanical, corrosion and erosion resistant properties, welds can be cold worked prior to annealing. A skewed-roll continuous furnace is preferred to insure uniform through wall annealing temperatures.

While the invention has been shown in one of its forms, it is not thus limited and is susceptible to various changes and modifications without departing from the spirit thereof.

I claim:

1. A method of manufacturing a welded seamless PIPE formed at least in part of a corrosion resistant and/or erosion resistant alloy, the method comprising the steps of:

manufacturing an ultrasonic inspected defect free finished plate of a corrosion and/or erosion resistant alloy;

forming a hollow having a wall thickness, a length and a longitudinal seam region by feeding the finished plate through a high speed roll forming mill;

welding the hollow along the longitudinal seam region using a tungsten inert gas or plasma welding process, achieving complete weld penetration through the wall thickness of the hollow with a similar filler material of like chemistry to the chemistry of the parent metal or without the use of a filler material;

ultrasonically inspect with multiple probes to insure the hollow's full-length weld seam is free of defects that exceed specifications;

rolling, flattening or forging the entire length of the hollow's weld seam;

full body anneal the weld heat affected zone to attain a homogenous through wall structure;

pickle or blast the welded hollow to remove oxide buildup from the annealing process;

cold work the welded low yield and tensile strengths hollow to reduce the welded hollow in wall thickness and in outer and inner diameters, thereby producing a high yield and tensile strengths cold worked PIPE;

full body ultrasonic inspection with multiple probes to insure the finished PIPE is free of defects that exceed specifications.

2. The method of claim 1, wherein the resulting PIPE has up to a maximum outer diameter limited only by the ability to cold work to a finished PIPE.

3. The method of claim 1, wherein the finished plate which is formed of corrosion or erosion resistant alloy which is selected from the group consisting of stainless steel; conventional austenitic, high alloy austenitic, martensitic, precipitation hardened, duplex and ferritic steels; precipitation hardened and solid solution nickel-base alloys; nickel copper alloys; and cobalt-base, titanium and zirconium alloys.

4. The method of claim 1, wherein the finished plate that is formed of corrosion or erosion resistant alloy formed of an alloy selected from the group consisting of nickel, chrome and titanium alloys and mixtures thereof.

5. The method of claim 1, wherein the welded hollow is full body annealed at a temperature and time formulated to coincide with the wall thickness of the welded hollow.

6. The method of claim 1, wherein the cold worked PIPE is greater in length than the welded hollow.

7. A PIPE with corrosion or erosion inhibiting characteristics, comprising: a PIPE body having a sidewall made of a corrosion or erosion resistant alloy, the sidewall having a chromium content of at least 22% and nickel content of at least 5% by weight throughout or titanium; wherein the wall up the tubular body defines an inside diameter surface and an outer diameter, the outer diameter being up to a maximum outer diameter limited only by the ability to cold work to a finished PIPE produced by a process including the steps of:

manufacturing an ultrasonic inspected defect free finished plate of a corrosion or erosion resistant alloy;

forming a hollow having a wall thickness, a length and a longitudinal seam region by feeding the finished plate through a high speed roll forming mill;

welding the hollow along the longitudinal seam region using a tungsten inert gas or plasma welding process, thereby achieving complete weld penetration through the wall thickness of the hollow with similar or like filler material to that of the parent metal or without the use of a filler material;

ultrasonically inspect with multiple probes to insure the hollow's full-length weld seam is free of defects that exceed specifications;

rolling, flattening or forging the entire length of the hollow's weld seam;

full body anneal the welded hollow to attain a homogenous granular through-wall structure of the weld and the PIPE body;

pickle or blast to remove oxide buildup from the annealing process to produce a finished welded hollow;

cold working the finished hollow to reduce the finished hollow in wall thickness and in outer diameter, thereby producing a cold worked PIPE.

full body ultrasonic inspection with multiple probes to insure the finished PIPE is free of defects that exceed specifications.

8. The method of claim 7, wherein the cold worked PIPE is greater in length than the welded hollow.

* * * * *